United States Patent [19]
Smith

[11] Patent Number: 5,963,345
[45] Date of Patent: Oct. 5, 1999

[54] HOLOGRAPHIC STOP SIGN

[75] Inventor: Ronald T. Smith, Corona Del Mar, Calif.

[73] Assignee: Delco Electronics Corporation, Kokomo, Ind.

[21] Appl. No.: 08/821,485

[22] Filed: Mar. 21, 1997

[51] Int. Cl.[6] ............................................ G03H 1/00
[52] U.S. Cl. .............................. 359/1; 359/13; 359/15; 359/22; 362/503
[58] Field of Search .................... 359/1, 13, 14, 359/15, 22, 25; 362/503

[56] References Cited

U.S. PATENT DOCUMENTS 5,186,533  2/1993  Hori ............................................ 359/13
5,303,129  4/1994  Hori ............................................ 359/15
5,383,039  1/1995  Smith .......................................... 359/13

Primary Examiner—Cassandra Spyrou
Assistant Examiner—Darren E. Schuberg
Attorney, Agent, or Firm—Jimmy L. Funke

[57] ABSTRACT

A warning indicator that comprises a lamp hidden adjacent to the roof of a vehicle, such as a school bus, and a transmission hologram decal containing a hologram that is mounted on a front or rear window of the vehicle. The lamp projects a beam of light downward onto the transmission hologram decal where it is diffracted by the hologram into a predetermined angular field of view at the front of rear of the vehicle. The hologram projects an image, such as the word "STOP", for example, to warn drivers of other vehicles that the vehicle, such as the school bus, for example, has come to a stop. The hologram is preferentially designed to have an asymmetrically-shaped field of view.

12 Claims, 4 Drawing Sheets

5,963,345

HOLOGRAPHIC STOP SIGN

BACKGROUND

The present invention relates generally to holographic lighting devices, and more particularly, to a holographic stop light for use in vehicular applications.

Every time a school bus comes to a stop and lets out child pedestrians, there is a potential for tragic fatal accidents between oncoming traffic and the child pedestrians. Last year alone, a large number of children in the United States were killed by vehicles passing by school buses.

Therefore, there is a great need in school buses to display a warning to oncoming vehicles that the bus is at a stop and the approaching vehicle should stop also. Prior art apparatus for providing "STOP" warning in school buses, for example, include mechanical "STOP" arms that move down when the driver comes to a stop. The mechanical arm is visible during the day but not very visible at night. Another apparatus is the use of flashing red warning lights on the bus to indicate the bus is stopped.

Unfortunately, studies have shown that neither of these methods is fully effective at catching the attention of oncoming vehicles. Studies have shown that a certain percentage of oncoming vehicles pass the stopped bus in spite of the warning indicator. Some of these drivers did see the warning but chose to ignore it; however, a significant percentage of these drivers simply did not see the warning indicator, perhaps because they were preoccupied or not looking directly at the bus. Therefore the conclusion that some fatal bus-related accidents occur because the driver of the oncoming vehicle did not see the "STOP" warning is inescapable.

Therefore, there is a need for a new warning indicator for use by school buses that is more conspicuous and captures the attention of a greater number of oncoming vehicles.

One prior art holographic lighting device that is particularly related to the present invention is described in U.S. Pat. No. 4,916,593 entitled "Remotely Illuminated Transparent Holographic Stoplight for Automobiles", assigned to the assignee of the present invention. U.S. Pat. No. 4,916,593 is discloses a holographic center-mounted, high-mounted, stop lamp located in a rear window of a vehicle that is horizontally centered on the rear window. A laterally symmetric field of view is generated by the diffracted light produced by this holographic stop lamp. The present invention does not have these limitations. The holographic center mounted stop lamp of U.S. Pat. No. 4,916,593 does not flash and uses only one lamp, and is only on when the driver applies the brakes. The present invention improves upon the teachings of U.S. Pat. No. 4,916,593.

Accordingly, it is an objective of the present invention to provide for an improved warning indicator for use by school buses and other vehicles. It is a further objective of the present invention to provide for an improved warning indicator that employs a holographic device as the indicator.

SUMMARY OF THE INVENTION

To meet the above and other objectives, the present invention provides for a lamp hidden adjacent to the roof of a vehicle, such as a school bus, and a transmission hologram decal containing a hologram that is mounted on a front or rear window of the vehicle, and in particular the school bus. The lamp projects a beam of light downward onto the transmission hologram decal where it is diffracted by the hologram into a predetermined angular field of view at the front of rear of the vehicle. The hologram of the hologram decal projects an image, such as the word "STOP", for example, to warn drivers of other vehicles that the vehicle, such as the school bus, for example, has come to a stop. The hologram is preferentially designed to have an asymmetrically-shaped field of view.

The present invention more conspicuously displays warning images such as "STOP" to approaching traffic than do conventional bus warning devices such as mechanical stop arms or flashing red lights. Furthermore, the present invention improves upon the holographic center mounted stop lamp of U.S. Pat. No. 4,916,593 by providing a warning indicator that has an asymmetrically-shaped field of view and that is more visible to drivers of vehicles approaching from both directions, and that provides a warning indication even when the vehicle brakes are not applied. The result is enhanced safety and fewer accidents involving oncoming traffic and child edestrians, for example. The present invention may also be adapted for use with uses, trucks, and other vehicles.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which

FIG. 4a illustrates a warning indicator for producing multiple images shown in FIG. 4a; and FIGS. 5a and 5b illustrate a hologram exposure system for use in producing the warning indicator shown in FIGS. 4 and 4a.

DETAILED DESCRIPTION

Figure 1A:
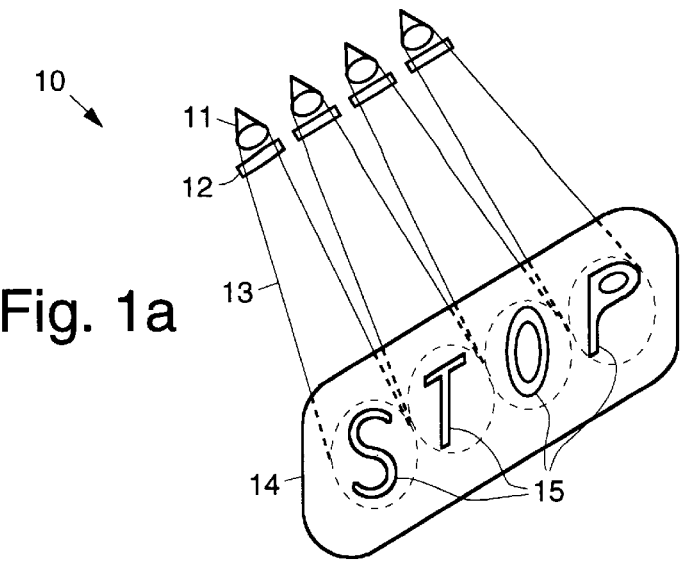
FIGS. 1a and 1b illustrate perspective and top views, respectively, of a warning indicator in accordance with the principles of the present invention.
Figure 1B:
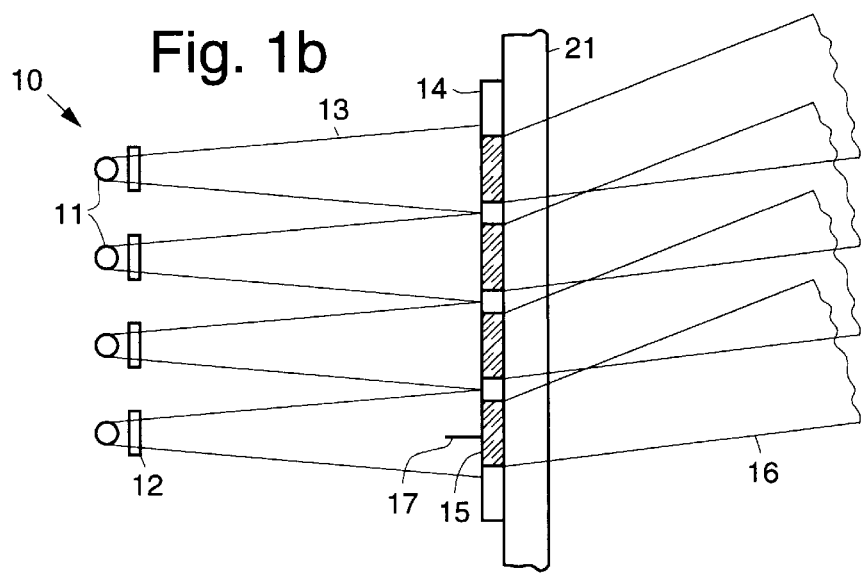
Figure 1C:
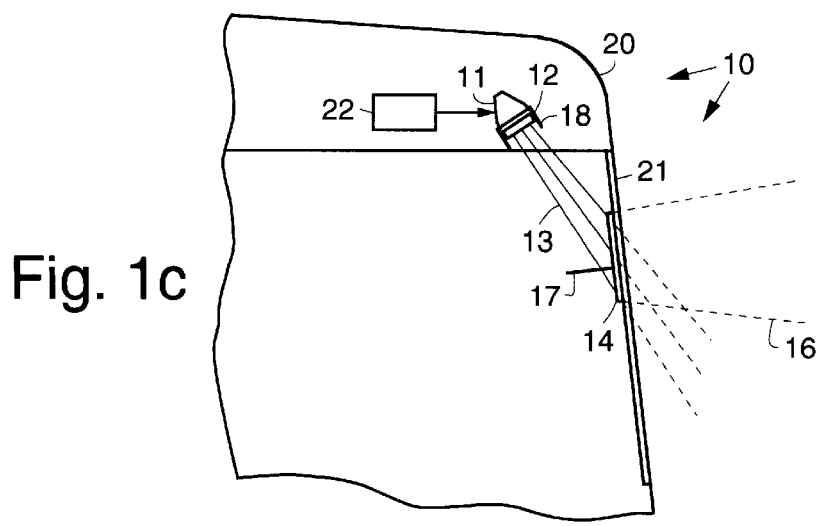
FIG. 1c illustrates a side view the warning indicator particularly illustrating its use in a school bus.

Referring to the drawing figures, FIGS. 1a and 1b illustrate perspective and top views, respectively, of a warning indicator 10 in accordance with the principles of the present invention. FIG. 1c illustrates a side view the warning indicator 10 and specifically illustrates its use in a school bus 20. The preferred embodiment of the warning indicator 10 is designed for use with school busses 20, and the following discussion relates to this application.

The warning indicator 10 comprises a holographic "STOP" sign 10. In a preferred embodiment of the holographic STOP sign 10, it is comprised of an array of four compact halogen lamps 11 having red colored filters 12 in front of them mounted adjacent a roof of the bus 20 (FIG. 1c) out of view occupants of the bus 20. Each of the compact halogen lamps 11 may have a shroud 18 surrounding it to control the light emitted thereby. A decal 14 comprising a transmission hologram 15 is mounted on an interior surface of a window 21 of the bus 20, such as a front windshield 21 or a rear window 21 of the bus 20 that is illuminated by the halogen lamps 11. A beam of light 13 from each halogen lamp 11 is projected down onto one-quarter of the area of the hologram decal 14 corresponding to a position of the holographic image 15 of one of the four letters in the word "STOP".

For example, a halogen lamp 11 for illuminating the letter "S" projects a beam of light 13 down onto a leftmost one-quarter of the hologram decal 14 which contains a holographic image 15 of the letter "S". The same situation exists for the halogen lamps 11 that illuminate the letters "T", "O", and "P", respectively. The hologram 15 diffracts the incident light 13 (diffracted light 16) and projects it into a specified, predetermined angular field of view which in general is asymmetric about a normal 17 to the hologram 15 and is custom-shaped to match a desired angular coverage. Furthermore, an electric signal supplied to the lamps 11 may be coupled to a flashing circuit 22 so that the halogen lamps 11 are made to flash with a desired period and duty cycle.

The result is that when the bus 20 comes to a stop, a very large, bright, and conspicuous red flashing STOP sign 10 appears in the window 21 of the bus 20 that is visible to drivers of approaching vehicles 25. Typically one STOP sign 10 (or hologram decal 14) is mounted on the front windshield 21 to alert drivers of vehicles 25 coming in the opposite direction and one STOP sign 10 is mounted in the rear window 21 to alert drivers of vehicles 25 behind the bus 20 coming towards the bus 20 from the rear. The hologram decal 14 is not necessarily centered left-to-right in the window 21 of the bus 20. For example, the transmission hologram decal 14 in the front windshield 21 is preferentially mounted on the right side of the windshield 21 (as viewed by the bus driver looking out) so as to not impede the view of the driver. Although the transmission hologram decal 14 is substantially transparent, it slightly degrades the view of the ambient scene through it. Furthermore, when the bus 20 is at a stop and the lamps 11 are on, the red light 13 projected down onto hologram decal 14 partially scatters off of dust and dirt on the windshield and back towards the driver. For these reasons, the front hologram decal 14 is placed on the right side of the front windshield 21.

Figure 2:
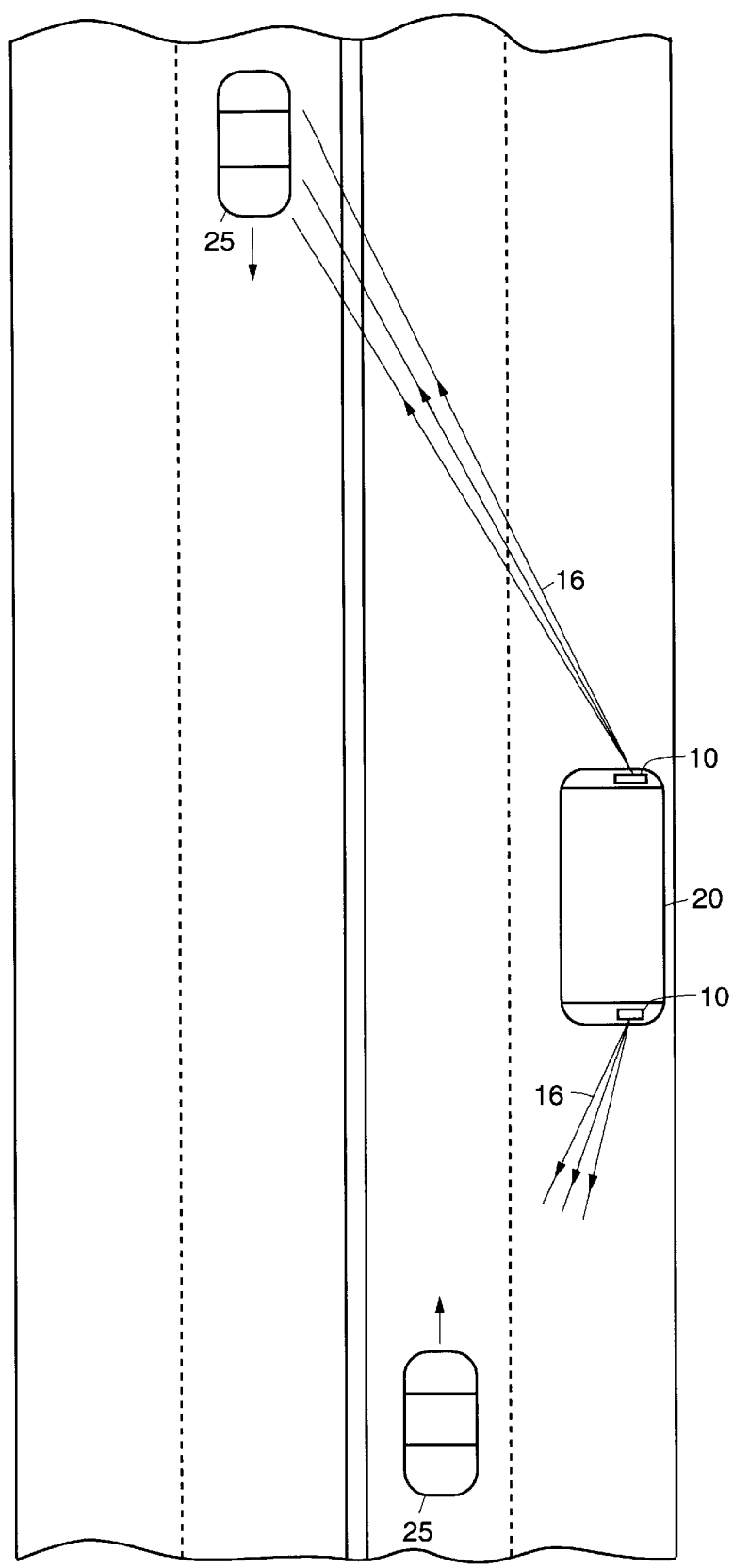
FIG. 2 illustrates the geometry for a warning indicator located at the front of a bus.

Each hologram decal 14 is designed to diffract incident light 13 into a desired field of view (diffracted light 16) which in general is asymmetric and not centered straight ahead or straight behind the bus 20. In particular, the front hologram 15 is designed to diffract light 13 into a lane or lanes of oncoming vehicles 25 approaching in the opposite direction, as is illustrated in FIG. 2. The rear hologram 15 is designed to diffract light 13 rearward into the lane or lanes of vehicles 25 moving in the same direction as the bus 20. Therefore, both holograms 15 are designed to have laterally asymmetric fields of view, and wherein the front hologram 15 is more laterally asymmetric than the rear hologram 15.

Figure 3:
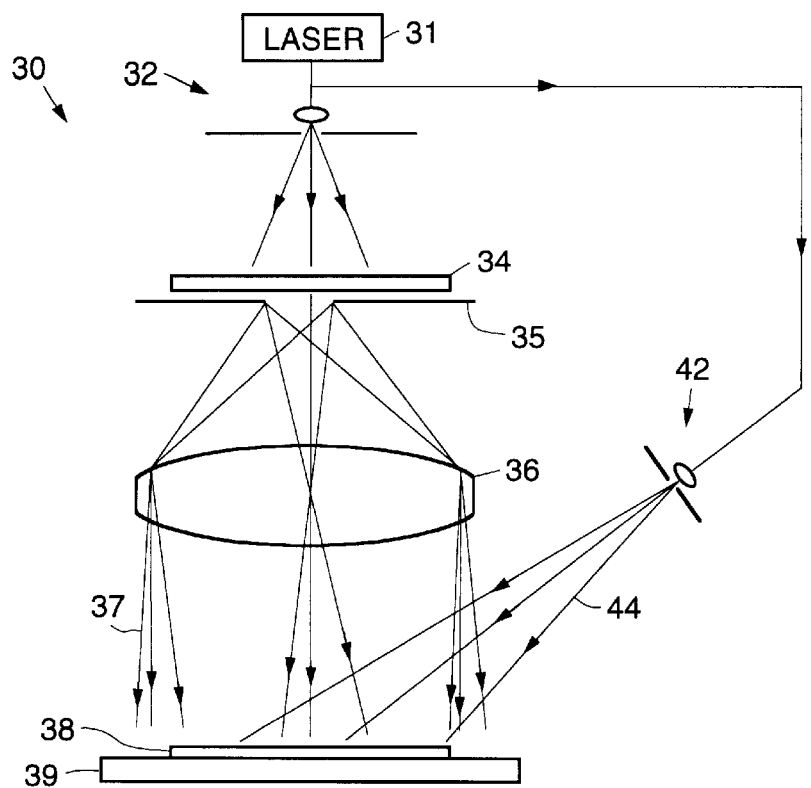
FIG. 3 illustrates a hologram exposure system for use in producing the present warning indicator.

This type of hologram 15 may be made using an exposure system 30 shown in FIG. 3. An object beam 37 shown in FIG. 3 is created by projecting a spherically diverging beam 37a using a laser 31 and a first spatial filter 32 onto a diffuser 34 that is blocked by an asymmetrical mask 35 that is located at a focal plane of a collimating lens 36. The light emitted from each point on the diffuser 34 is collected and collimated by the lens 36 and leaves the lens 36 at the same angle relative to an axis of the lens 36 as the angle subtended by the point on the diffuser 34 with respect to the lens axis. Therefore the shape of collimated diffuse cones of light emitted from the collimating lens 36 are determined by the shape of the mask at the diffuser 34. Thus, an opening in the mask 35 can be shaped to provide whatever asymmetric shape of diffuse cone that is desired. The diffuse cones of light interfere with a spherically diverging reference beam 44 created by the laser 31 and a second spatial filter 42 at a plane containing hologram film 38 mounted on a rigid substrate 39, such as glass, and the hologram 15 is recorded. When the hologram 15 is played back, it diffracts a diffuse beam that has the same asymmetric shape as the diffuse beam comprising the object beam 37 used in the exposure system 30.

The exposure system 30 of FIG. 3 is used to record the hologram 15 for each letter in the word "STOP". The shape of the actual letter, for example "S", is created before the hologram 15 is recorded by creating an S-shaped mask (which is clear everywhere except in the area of the letter "S"), placing it over the hologram film 38, and exposing it to ultraviolet light. The ultraviolet light deadens the film 38 everywhere except for the area of film 38 that is covered by the letter "S". When the hologram 15 is recorded using the exposure system 30 of FIG. 3, it is recorded as an "S" shaped hologram 15 because that is the only area of the hologram 15 not photo-deadened from the ultraviolet pre-exposure. The four individual hologram letters are recorded separately and then laminated together to create the hologram decal 14 such as is shown in FIG. 1.

Designing the hologram 15 to diffract light 13 only to where it is needed causes the brightness of the resultant image to be optimized. If light from the hologram 15 were to be diffracted in all directions, the result would be a much dimmer image. The ability of the hologram 15 to diffract the light 13 only into the desired field of view tends to make it brighter than conventional "STOP" warning indicators.

Figure 4:
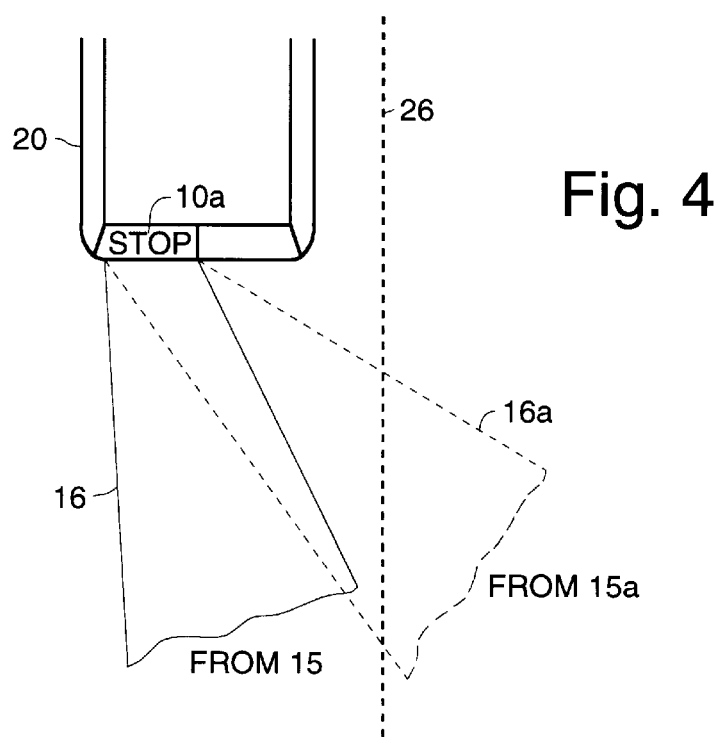
FIG. 4 illustrates multiple images produced by one embodiment of the present warning indicator.
Figure 4A:
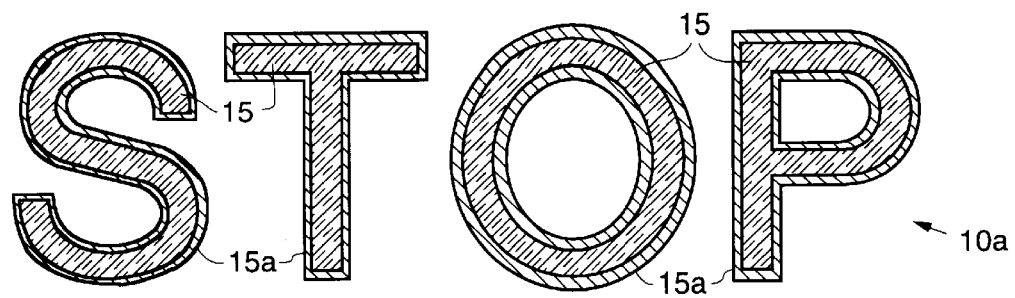

Furthermore, the hologram 15 may be designed to change its image as an oncoming vehicle 25 approaches. A simplified example of this is shown in FIGS. 4 and 4a. As the vehicle 25 approaches from afar, the driver sees a flashing red solid "STOP" image against a black background. As the driver continues approaching, a point is reached where the red solid "STOP" image disappears and a red hollow "STOP" image appears. The red hollow "STOP" image uses a different portion of the hologram film 38 than the red solid "STOP" image. This is important, because the light 13 reaching the hologram 15 of the solid "STOP" image is diffracted entirely into the field of view intended for the solid "STOP" image, whereas the light 13 incident on the hollow "STOP" image of the hologram film 38 is diffracted solely into the field of view intended for the hollow "STOP" image. The result is greater image brightness for each of the two images.

Figure 5A:
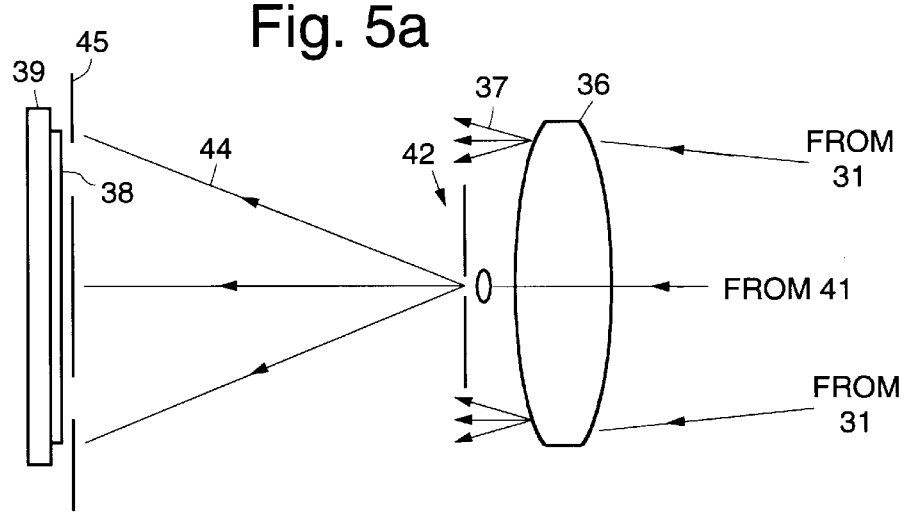
Figure 5B:
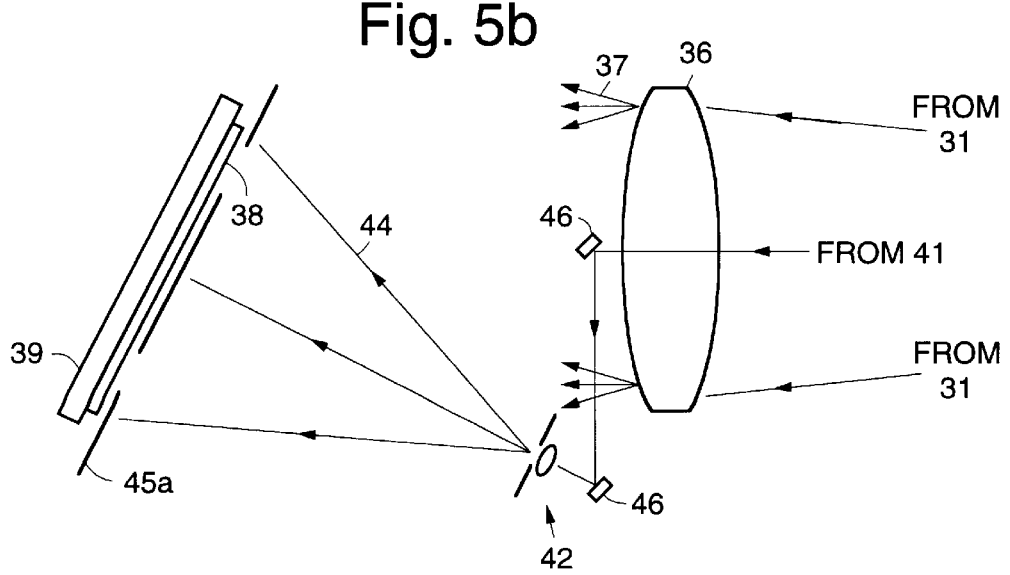

The hologram 15 shown in FIGS. 4 and 4a may be recorded by the exposure system 30a shown in FIGS. 5a and 5b. The exposure system 30a shown in FIGS. 5a and 5b is substantially the same as the exposure system 30 shown in FIG. 3 viewed from the side (the side to the right of the reference beam 44 in FIG. 3). A first mask 45 is disposed in front of the hologram film 38. Referring to FIG. 5a, the first mask 45 defines the shape of the "S" for a first hologram 15, and the first hologram 15 is recorded in a first exposure. Then, the reference beam 44 and hologram film 38 are rotated downward as shown in FIG. 5b, and the first mask 45 is removed, and a second mask 45a is put in its place. A second hologram 15a is then recorded in a different area of the film 38 than the first hologram 15. The reference light source 41, spatial filter 42, and reference lens 43 are used in conjunction with a plurality of reflectors 46 to record the second hologram 15a.

A four-lamp stop sign 10 at the front of the bus 20 and a four-lamp stop sign 10 at the rear of the bus 20 may require significant amperage draw from the bus 20 electrical system. To achieve a desirable brightness level of the "STOP" image 15 requires four twelve volt, fifty watt halogen narrow spot lamps 11. Therefore, each halogen lamp 11 draws about four amps of pulsing electrical current. However, by choosing a fifty percent duty cycle and by making the rear stop sign 10 fifty percent out of phase from the front stop sign 10, a system is provided where the front sign 10 is on when the rear sign 10 is off and vice-versa. The amperage draw on the bus 20 electrical system is a constant four amps of DC current, even though a total of eight peak-to-base AC amps are required.

In Europe, buses 20 that are used to drive school children are often identical to buses 20 used for general mass transit. Therefore, there is a greater potential for accidents due to drivers who assume that the bus 20 in question is not carrying school children who may unexpectedly run out into the lane of approaching traffic. To prevent this from happening, one may use the present invention, except that, instead of displaying the word "STOP" with four lamps 11, for example, another type of warning sign 10 may be displayed using one or two lamps 11. In fact, the present invention may be used for a wide variety of warning indicators 10 in not only school buses 20 but in general transportation buses, trucks, farm equipment, and other vehicles.

In summary, the holographic "STOP" sign 10 of the present invention is superior to conventional stop indicators used with school buses 20 because it is significantly more conspicuous than the conventional devices. The result is that more drivers see the "STOP" warning and end up stopping, resulting in less accidents between the approaching vehicles 25 and the pedestrians.

Certain features of the present invention, including the remotely located lamp 11 and hologram 15 mounted on a vehicle window 21, are described in U.S. Pat. No. 4,916,593 discussed above. However, the present invention improves upon the teachings of this patent in a number of ways.

The holographic device described in U.S. Pat. No. 4,916,593 is a holographic stop lamp 11 located in the rear window 21 that is horizontally centered on the rear window 21. The present invention may be used on the rear window 21, the front window 21, or side windows 21, and the hologram 15 is not centered on the respective window 21. The holographic device of U.S. Pat. No. 4,916,593 has a laterally symmetric field of view of diffracted light. The present invention uses an asymmetric, custom-shaped field of view, as was shown and explained with reference to FIGS. 1–3.

The hologram 15 in the present invention may include multiple images designed to be viewable by oncoming driver from different vantage points, thereby increasing its conspicuousness. The lamp 11 in the present invention may flash to increase its conspicuousness, whereas the device described in U.S. Pat. No. 4,916,593 does not flash. The present invention may use a flashing front stop sign 10 and rear stop sign 10 working in tandem to draw constant DC current from the electrical system, whereas U.S. Pat. No. 4,916,593 describes a single holographic center-mounted stop lamp.

The present invention includes multiple lamps 11, one lamp 11 per letter in the stop sign 10, whereas the device described in U.S. Pat. No. 4,916,593 only uses one lamp. The present invention may display symbols of any color at any time while the bus 20 is driven. For example, a "SCHOOL BUS" image 15 in European buses 20 might be on continuously while the bus 20 is driven, whereas the holographic device of U.S. Pat. No. 4,916,593 is only on when the driver applies the brakes.

Thus, an improved holographic stop light for use in vehicles has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A warning indicator for use in a vehicle, said indicator comprising:
   a plurality of lamps;
   a decal comprising a transmission hologram disposed on an interior surface of a window of the vehicle that diffracts light emitted by the plurality of lamps and projects it into a specified, predetermined angular field of view which is asymmetric about a normal to the hologram such that the diffracted light is not centered straight ahead or straight behind the vehicle.

2. The warning indicator of claim 1 which further comprises a plurality of colored filters respectively disposed in front of the plurality lamps.

3. The warning indicator of claim 1 wherein each of the lamps has a shroud surrounding it.

4. The warning indicator of claim 1 wherein the vehicle comprises a bus, and the plurality of lamps are disposed adjacent a roof of the bus.

5. The warning indicator of claim 4 wherein the decal is disposed on an interior surface of a front windshield of the bus.

6. The warning indicator of claim 4 wherein the decal is disposed on an interior surface of a rear window of the bus.

7. The warning indicator of claim 6 wherein the transmission hologram comprises the word STOP, and a beam of light derived from each lamp is projected onto a portion of the area of the hologram decal corresponding to a position of the holographic image of one of the four letters in the word STOP.

8. The warning indicator of claim 1 wherein the hologram is not centered on the window.

9. The warning indicator of claim 1 wherein the lamps are coupled to a flashing circuit and are made to flash with a predetermined period and duty cycle.

10. The warning indicator of claim 1 wherein decal comprises first and second holograms that diffract light emitted by the plurality of lamps and projects it into two different predetermined angular fields of view.

11. A warning indicator for use in a vehicle, said indicator comprising:
   a plurality of lamps;
   a decal comprising first and second transmission holograms disposed on an interior surface of a window of the vehicle;
   and wherein the holograms diffracts light emitted by the plurality of lamps and diffract light emitted by the plurality of lamps and projects it into two different predetermined angular fields of view.

12. The warning indicator of claim 11 wherein the two different predetermined angular fields of view are asymmetric about a normal to the respective holograms.

* * * * *